United States Patent
Mazumdar et al.

(10) Patent No.: US 8,500,877 B2
(45) Date of Patent: Aug. 6, 2013

(54) SYSTEM AND METHOD FOR CONVEYING A SOLID FUEL IN A CARRIER GAS

(75) Inventors: Anindra Mazumdar, Katy, TX (US);
Sunil Ramabhilakh Mishra, Pearland, TX (US); Rupinder Singh Benipal, Houston, TX (US)

(73) Assignee: General Electric Company, Schenectady, NY (US)

( * ) Notice: Subject to any disclaimer, the term of this patent is extended or adjusted under 35 U.S.C. 154(b) by 468 days.

(21) Appl. No.: 12/781,778

(22) Filed: May 17, 2010

(65) Prior Publication Data

US 2011/0277385 A1 Nov. 17, 2011

(51) Int. Cl.
*B01D 53/02* (2006.01)
(52) U.S. Cl.
USPC .............. 96/109; 95/139; 48/77; 137/565.01; 137/565.18; 96/128; 96/131
(58) Field of Classification Search
USPC ................... 95/139; 96/109, 128, 131; 48/77; 137/565.01, 565.18
See application file for complete search history.

(56) References Cited

U.S. PATENT DOCUMENTS

| | | | | |
|---|---|---|---|---|
| 3,212,279 A * | 10/1965 | Cope | ............... | 62/48.2 |
| 3,417,572 A * | 12/1968 | Pryor | ............... | 62/634 |
| 3,801,708 A * | 4/1974 | Mc Leod et al. | .............. | 423/650 |
| 4,353,713 A * | 10/1982 | Cheng | ............... | 48/202 |
| 4,928,498 A * | 5/1990 | Gossler | ................. | 62/81 |
| 5,061,465 A * | 10/1991 | Carter | ............ | 423/229 |
| 7,766,999 B2 * | 8/2010 | Ha | ................... | 95/114 |
| 2009/0095155 A1 * | 4/2009 | Frydman et al. | ............... | 95/172 |
| 2010/0126067 A1 * | 5/2010 | Koyama et al. | ................... | 48/77 |
| 2010/0180502 A1 * | 7/2010 | Koyama et al. | .................. | 48/76 |
| 2010/0272619 A1 * | 10/2010 | Frydman et al. | ............. | 422/193 |
| 2010/0325958 A1 * | 12/2010 | Molaison | ........................ | 48/128 |
| 2011/0229382 A1 * | 9/2011 | Frydman et al. | ............. | 422/621 |

FOREIGN PATENT DOCUMENTS

WO   WO 2009/069330   *   6/2009

OTHER PUBLICATIONS

U.S. Appl. No. 12/781,781, filed May 17, 2010, Anindra Mazumdar et al.

* cited by examiner

*Primary Examiner* — Christopher P Jones
(74) *Attorney, Agent, or Firm* — Fletcher Yoder, P.C.

(57) ABSTRACT

Systems are provided for gasification operations. The systems may use carbonous gas as part of plant operations. The systems may include a gasifier and a solid fuel feeder. The solid fuel feeder is capable of feeding solid fuel in a carbonous carrier gas to the gasifier during a startup period and also during a steady state period of the gasifier.

14 Claims, 4 Drawing Sheets

SYSTEM AND METHOD FOR CONVEYING A SOLID FUEL IN A CARRIER GAS

BACKGROUND OF THE INVENTION

The subject matter disclosed herein relates to systems and methods for conveying solid feed fuel, such as pulverized coal, in a power plant.

Fossil fuels, such as coal or petroleum, may be gasified for use in the production of electricity, chemicals, synthetic fuels, or for a variety of other applications. Gasification involves reacting a carbonaceous fuel and oxygen at a very high temperature to produce syngas, i.e., a fuel containing carbon monoxide and hydrogen, which burns much more efficiently and cleaner than the fuel in its original state. For example, a solid fuel feed (e.g., pulverized coal) may be delivered to a gasifier in a carrier gas. The type of carrier gas used may complicate the control and performance of the gasifier and other components.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier and a solid fuel feeder. The solid fuel feeder is capable of feeding solid fuel in a carbonous carrier gas to the gasifier during a startup period and during a steady state period of the gasifier.

In a second embodiment, a system includes a gasifier fuel controller. The gasifier fuel controller is capable of controlling a feed of a solid fuel in a carbonous carrier gas to a gasifier. The gasifier fuel controller is capable of transitioning between a first source of the carbonous carrier gas during a startup period and a second source of the carbonous carrier gas during a steady state period.

In a third embodiment, a system includes a feedstock preparation unit, a solid fuel grinder, and a solid fuel feeder. The solid fuel grinder is capable of grinding a solid fuel into particles. The solid fuel feeder is capable of fluidizing the particles into a carbonous carrier gas from a first carbonous gas source during a startup period of a gasifier and a second carbonous gas source during a steady state period of the gasifier.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for utilizing carbonous gas (e.g., $CO_2$) from different sources, for example, an enhanced oil recovery (EOR) pipeline, as a carrier gas used to convey a fuel into a gasifier. Power plants, for example, the integrated gasification combined cycle (IGCC) power plant described in more detail with respect to FIG. 1 below, may use a solid fuel feeder system that continuously feeds solid fuel into the gasifier during plant operations. The solid fuel feeder system may use $CO_2$ that is produced during normal plant operations as the carrier gas. However, this source of carrier $CO_2$ may not be available during startup operations.

A different type of carrier gas such as nitrogen may replace $CO_2$ during plant startup and used to convey the fuel into the gasifier. However, nitrogen is not as good a radiation absorber as $CO_2$ and consequently, higher heat loads may be experienced by the gasifier. Higher heat loads may adversely affect gasifier components such as feed injectors, particularly during startup when the gasifier temperatures are higher than during normal operations. Producing the required high pressure nitrogen may also be costly. Further, the different molecular weight of nitrogen may necessitate the use of different solid-to-gas loading ratios and loading velocities, thereby requiring different controller modalities than those used during regular $CO_2$ conveyance operations. Accordingly, the disclosed embodiments use $CO_2$ as a carrier gas during plant startup operations by redirecting $CO_2$ from other sources, and subsequently use $CO_2$ produced by the plant during normal operation.

Figure 1:
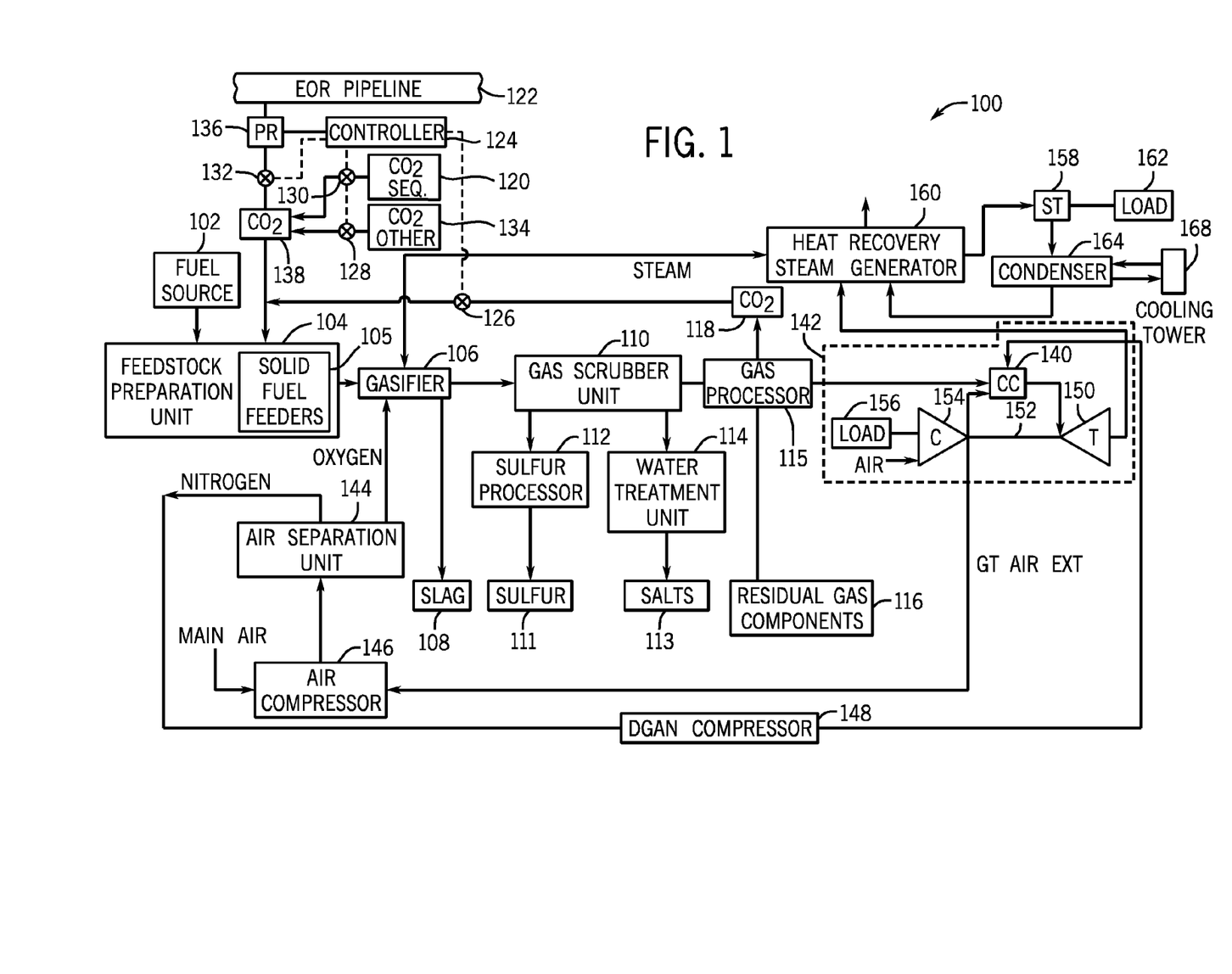
FIG. 1 depicts a block diagram of an embodiment of an integrated gasification combined cycle (IGCC) power plant, including an enhanced oil recovery pipeline (EOR)

With the foregoing in mind, FIG. 1 depicts an embodiment of an IGCC power plant 100 that may produce and burn a synthetic gas, i.e., syngas. Elements of the IGCC power plant 100 may include a fuel source 102, such as a solid feed, that may be utilized as a source of energy for the IGCC 100. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In certain embodiments, no liquid is added to the fuel source, thus yielding dry feedstock. As discussed in more detail below with respect to FIG. 2, the solid feedstock may be conveyed by a solid fuel feeder 105 using a carbonous gas (e.g., $CO_2$) into a gasifier 106 for use during plant startup periods as well as during normal plant operations (i.e., steady state periods). In other words, the same (or substantially the same) carrier gas may be used at all times to convey the solid feedstock to the gasifier. It is to be understood that the carbonous carrier gas may be between 80-100 percent pure by volume.

The gasifier 106 may convert the feedstock into a syngas, e.g., a combination of carbon monoxide and hydrogen. This conversion may be accomplished by subjecting the feedstock to a controlled amount of any moderator and limited oxygen at elevated pressures (e.g., from approximately 600 pounds per square inch gauge (PSIG)-1200 PSIG) and temperatures (e.g., approximately 2200° F.-2700° F.), depending on the type of feedstock used. The heating of the feedstock during a pyrolysis process may generate a solid (e.g., char) and residue gases (e.g., carbon monoxide, hydrogen, and nitrogen).

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 2200° F. to approximately 2700° F. In addition, steam may be introduced into the gasifier 106. The gasifier 106 utilizes steam and limited oxygen to allow some of the feedstock to be burned to produce carbon monoxide and energy, which may drive a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed untreated syngas, since it contains, for example, $H_2S$. The gasifier 106 may also generate waste, such as slag 108, which may be a wet ash material. This slag 108 may be removed from the gasifier 106 and disposed of, for example, as road base or as another building material. To treat the untreated syngas, a gas scrubber 110 may be utilized. In one embodiment, the gas scrubber 110 may be a water gas shift reactor. The gas scrubber 110 may scrub the untreated syngas to remove the HCl, HF, COS, HCN, and $H_2S$ from the untreated syngas, which may include separation of sulfur 111 in a sulfur processor 112 by, for example, an acid gas removal process in the sulfur processor 112. The performance of the acid gas removal process may be enhanced when using $CO_2$ as a carrier gas due to the increased partial pressure of the $CO_2$ in the syngas. Furthermore, the gas scrubber 110 may separate salts 113 from the untreated syngas via a water treatment unit 114 that may utilize water purification techniques to generate usable salts 113 from the untreated syngas. Subsequently, the gas from the gas scrubber 110 may include treated syngas, (e.g., the sulfur 111 has been removed from the syngas), with trace amounts of other chemicals, e.g., $NH_3$ (ammonia) and $CH_4$ (methane).

A gas processor 115 may be used to remove additional residual gas components 116, such as ammonia and methane, as well as methanol or any residual chemicals from the treated syngas. However, removal of residual gas components from the treated syngas is optional, since the treated syngas may be utilized as a fuel even when containing the residual gas components, e.g., tail gas. At this point, the treated syngas may include approximately 3% CO, approximately 55% $H_2$, and approximately 40% $CO_2$ and is substantially stripped of H2S.

In some embodiments, a carbon capture system 118 may extract and process the carbonous gas (e.g., $CO_2$ that is approximately 80-100 percent or 90-100 percent pure by volume) contained in the syngas. The extracted $CO_2$ may be transferred into the feedstock preparation unit 104 for use as the carrier gas for dry fuel as described in more detail below with respect to FIGS. 2, 3, and 4. In certain embodiments, the carbon capture system 118 may also redirect the extracted $CO_2$ into a carbon sequestration system 120, an EOR pipeline 122, and/or other sources of $CO_2$ 134 (e.g., storage tanks) for use in, for example, oil recovery activities. Thus, in the illustrated embodiments, a gasifier fuel controller 124 may direct the transfer of the $CO_2$ into the feedstock preparation unit 104 through the use of, for example, valves 126, 128, 130, and 132.

Valve 126 is used to adjust (e.g., increase or decrease) the $CO_2$ flow from the carbon capture system 118 to the feedstock preparation unit 104. Valve 128 is used to adjust the $CO_2$ flow from other $CO_2$ sources 134, for example, $CO_2$ storage tanks to the feedstock preparation unit 104. Valve 130 is used to adjust the $CO_2$ flow from the carbon sequestration system 120 to the feedstock preparation unit 104. In certain embodiments where the EOR pipeline 122 carries high pressure $CO_2$, a pressure reducer 136 is installed downstream of the EOR pipeline 122 and used to reduce the amount of pressure of the $CO_2$ flowing back from the EOR pipeline 122. In these embodiments, a valve 132 is used to adjust the $CO_2$ flow from the pressure reducer 136 to the feedstock preparation unit 104. In other embodiments without the pressure reducer 136, the valve 132 is used to adjust the $CO_2$ flow from the EOR pipeline 122 to the feedstock preparation unit 104. Consequently, a startup $CO_2$ 138 flow may be attained by including $CO_2$ flows from sources such as the EOR pipeline 122, the $CO_2$ sequestration system 120, and/or the other $CO_2$ sources 134. The startup $CO_2$ 138 may then be used during plant startup operations as described in more detail with respect to FIGS. 2, 3, and 4 below.

Continuing with the syngas processing, once the $CO_2$ has been captured from the syngas, the treated syngas may be then transmitted to a combustor 140, e.g., a combustion chamber, of a gas turbine engine 142 as combustible fuel. The IGCC power plant 100 may further include an air separation unit (ASU) 144. The ASU 144 may operate to separate air into component gases by, for example, distillation techniques. The ASU 144 may separate oxygen from the air supplied to it from a supplemental air compressor 146, and the ASU 144 may transfer the separated oxygen to the gasifier 106. Additionally the ASU 144 may transmit separated nitrogen to a diluent nitrogen (DGAN) compressor 148.

The DGAN compressor 148 may compress the nitrogen received from the ASU 144 at least to pressure levels equal to those in the combustor 140, so as not to interfere with the proper combustion of the syngas. Thus, once the DGAN compressor 148 has adequately compressed the nitrogen to a proper level, the DGAN compressor 148 may transmit the compressed nitrogen to the combustor 140 of the gas turbine engine 142. The nitrogen may be used as a diluent to facilitate control of emissions, for example.

As described previously, the compressed nitrogen may be transmitted from the DGAN compressor 148 to the combustor 140 of the gas turbine engine 142. The gas turbine engine 142 may include a turbine 150, a drive shaft 152 and a compressor 154, as well as the combustor 140. The combustor 140 may receive fuel, such as syngas, which may be injected under pressure from fuel nozzles. This fuel may be mixed with compressed air as well as compressed nitrogen from the DGAN compressor 148, and combusted within combustor 140. This combustion may create hot pressurized exhaust gases.

The combustor 140 may direct the exhaust gases towards an exhaust outlet of the turbine 150. As the exhaust gases from the combustor 140 pass through the turbine 150, the exhaust gases force turbine blades in the turbine 150 to rotate the drive shaft 152 along an axis of the gas turbine engine 142. As illustrated, the drive shaft 152 is connected to various components of the gas turbine engine 142, including the compressor 154.

The drive shaft 152 may connect the turbine 150 to the compressor 154 to form a rotor. The compressor 154 may include blades coupled to the drive shaft 152. Thus, rotation of turbine blades in the turbine 150 may cause the drive shaft 152 connecting the turbine 150 to the compressor 154 to rotate blades within the compressor 154. This rotation of blades in the compressor 154 causes the compressor 154 to compress air received via an air intake in the compressor 154. The compressed air may then be fed to the combustor 140 and mixed with fuel and compressed nitrogen to allow for higher efficiency combustion. Drive shaft 152 may also be connected to load 156, which may be a stationary load, such as an electrical generator for producing electrical power, for example, in a power plant. Indeed, load 156 may be any suitable device that is powered by the rotational output of the gas turbine engine 142.

The IGCC power plant 100 also may include a steam turbine engine 158 and a heat recovery steam generation (HRSG) system 160. The steam turbine engine 158 may drive a second load 162. The second load 162 may also be an electrical generator for generating electrical power. However, both the first and second loads 156, 162 may be other types of loads capable of being driven by the gas turbine engine 142 and steam turbine engine 158. In addition, although the gas turbine engine 142 and steam turbine engine 158 may drive separate loads 156 and 162, as shown in the illustrated embodiment, the gas turbine engine 142 and steam turbine engine 158 may also be utilized in tandem to drive a single load via a single shaft. The specific configuration of the steam turbine engine 158, as well as the gas turbine engine 142, may be implementation-specific and may include any combination of sections.

The system 100 may also include the HRSG 160. Heated exhaust gas from the gas turbine engine 142 may be transported into the HRSG 160 and used to heat water and produce steam used to power the steam turbine engine 158. Exhaust from, for example, a low-pressure section of the steam turbine engine 158 may be directed into a condenser 164. The condenser 164 may utilize a cooling tower 168 to exchange heated water for chilled water. The cooling tower 168 acts to provide cool water to the condenser 164 to aid in condensing the steam transmitted to the condenser 164 from the steam turbine engine 158. Condensate from the condenser 164 may, in turn, be directed into the HRSG 160. Again, exhaust from the gas turbine engine 142 may also be directed into the HRSG 160 to heat the water from the condenser 164 and produce steam.

In combined cycle power plants such as IGCC power plant 100, hot exhaust may flow from the gas turbine engine 142 and pass to the HRSG 160, where it may be used to generate high-pressure, high-temperature steam. The steam produced by the HRSG 160 may then be passed through the steam turbine engine 158 for power generation. In addition, the produced steam may also be supplied to any other processes where steam may be used, such as to the gasifier 106. The gas turbine engine 142 generation cycle is often referred to as the "topping cycle," whereas the steam turbine engine 158 generation cycle is often referred to as the "bottoming cycle." By combining these two cycles as illustrated in FIG. 1, the IGCC power plant 100 may lead to greater efficiencies in both cycles. In particular, exhaust heat from the topping cycle may be captured and used to generate steam for use in the bottoming cycle.

Figure 2:
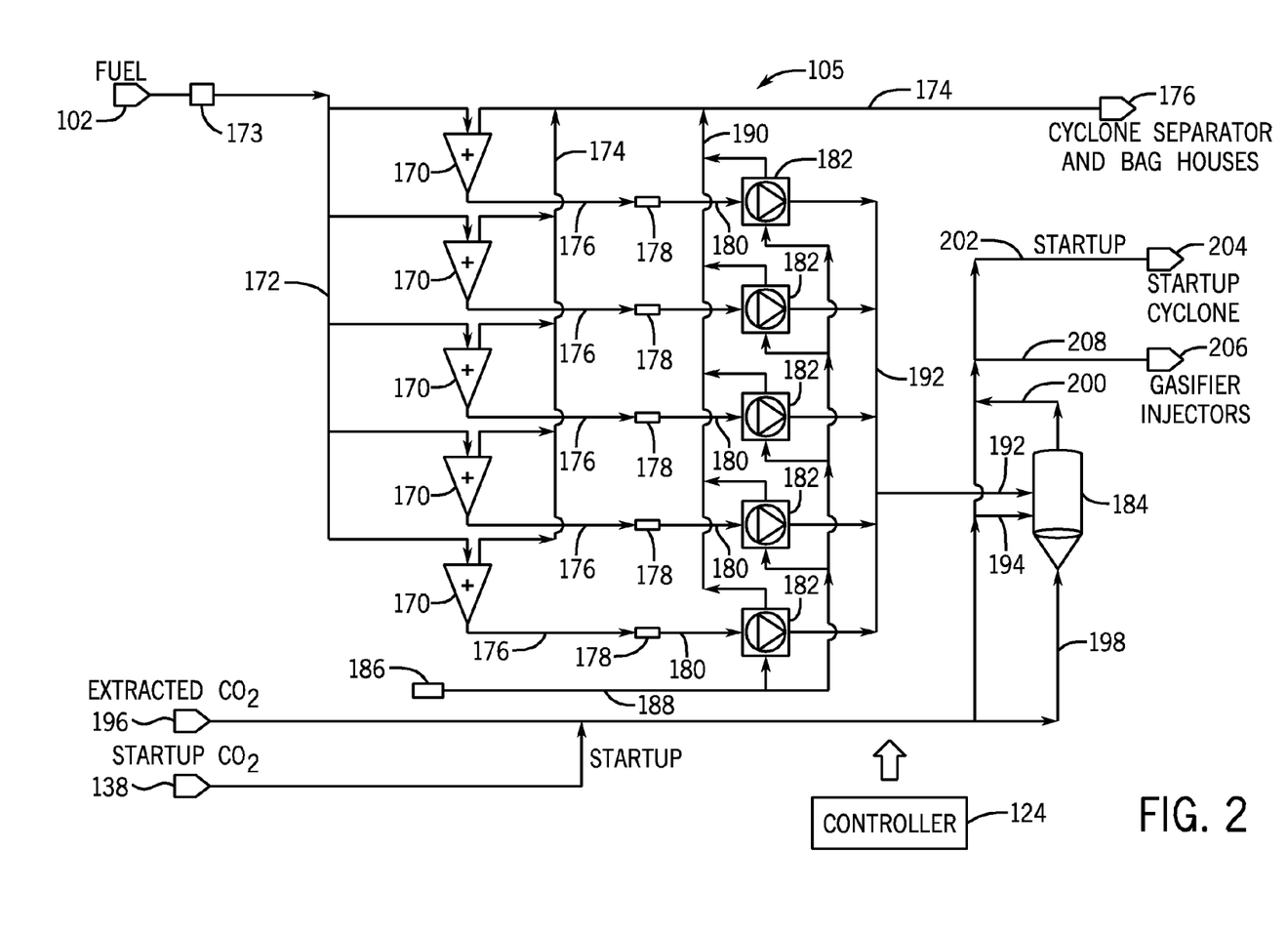
FIG. 2 depicts a block diagram of an embodiment of a solid fuel feeder system of a feedstock preparation unit depicted in FIG. 1.

FIG. 2 is a diagram of an embodiment of a solid fuel feeder 105 that may be used to convey a fuel source into the gasifier 106 of FIG. 1. In certain embodiments, the fuel source 102 includes solid feed fuel sources. For example, the IGCC power plant 100 may use solid fuel sources including high rank coals, low rank coals (e.g., Powder River Basin coal), biomass, and others. Powder River Basin coal may include sub-bituminous coal with lower energy than bituminous coal. Indeed, a wide variety of solid fuels may be used. In one embodiment, the solid fuel feeder 105 may dry the solid fuel 102 so as to remove some of the inherent moisture in the fuel. In other embodiments, the fuel may be dried by other systems included in the feedstock preparation unit 104 of FIG. 1. In yet another embodiment, the fuel may be delivered to the IGCC power plant 100 as dry fuel. Drying the solid fuel 102 may thus improve the flow characteristics of solid fuel conveyance systems as well as improve the overall efficiency of the gasifier 106.

After drying, the solid fuel 102 may be directed into a plurality of pump feed hoppers 170 through a solid feedstock conveyor 172 (e.g., pneumatic transport, gas entrained conveyor) for use in gasification. In certain embodiments, other processes may occur prior to the transfer or during the transfer of the solid fuel 102 into the pump feed hoppers 170. In certain embodiments, the solid fuel 102 may be milled, shredded, pulverized, ground and so forth by a solid fuel grinder 173. In other embodiments, the milling, shredding, pulverizing, grounding and so forth may be accomplished by other systems upstream of the solid fuel feeder 105.

The pump feed hoppers 170 may act as feedstock buffers to ensure an even, constant flow of feedstock into the gasifier 106. The pump feed hoppers 170 may include, for example, vents that allow dust entrained in a atmospherically-ventable carrier gas such as nitrogen to exit the feed hoppers 170 into a conduit 174, as illustrated. The conduit 174 may be used to convey the entrained dust from the feed hopper 170 into a cyclone separator and bag house system 176. The cyclone separator and baghouse system 176 may then separate the dust particulate from the gas, through the use of, for example, an aerodynamic vortex effect, gravity, and a set of filters (i.e., baghouses). The separated dust particulate may include fuel particulate which may be reused as fuel 102.

In one embodiment, such as the embodiment depicted in FIG. 2, the solid feed may be directed from the pump feed hopper 170 via a solid feedstock conveyor 176 into a magnetic separator 178. The magnetic separator 178 may be used to recover ferromagnetic materials (e.g., iron, nickel) that could reduce the gasifier's yields. The non-ferromagnetic feedstock may then be directed via a conduit 180 into a solid feed pump 182. In certain embodiments, the solid feed pump 182 may include a Stamet™ Posimetric® solid feed pump, such as those commercially available from the General Electric Corporation of Schenectady, N.Y. The solid feed pump 182 may be capable of transporting solids from atmospheric pressures (i.e. approximately 14.7 PSIG) to pressures of approximately 1000, 1100, 1200, 1300 PSIG.

The higher pressure provided by the solid feed pump 182 may allow the solid feedstock to enter a high pressure vessel, such as a high pressure conveyance vessel 184, which may be pressurized to a pressure below 1000 PSIG. The solid feed pump 182 may also be capable of using a gas 186 as a sealing gas. The sealing gas 186 may flow at high pressure through conduit 188 and into the plurality of solid feed pumps 182. The sealing gas 186 may then traverse upstream through the solid particles that are moving through the solid feed pump 182, freely blocking leakage of conveying gas, oxygen, or syngas upstream through the solid feed pump 182. The sealing gas 186 and entrained dust may vent out of solid feed pump 182 into conduit 174 via conduit 190. The entrained dust can then be further processed by the cyclone separator and baghouse system 176 as described above. The sealing gas may thus allow for the solid feed pump 182 to increase its conveyance pressure. Alternatively or additionally, any type of pump or pressurized conveyance device that may be capable of conveying the solid feed into the high pressure conveyance vessel 184 as describe herein may be used in lieu of solid feed pump 182.

The dry feed may be conveyed via conduit 192 into the high pressure conveyance vessel 184. The high pressure conveyance vessel 184 may be used to fluidize the solid feedstock. The fluidization of the feedstock will suspend the particles or particulate of the solid fuel in the carbonous carrier gas. In other words, it creates a multi-phase flow of particulate and gas, or gas-particulate fluid flow. In certain embodiments, the gasifier fuel controller 124 may control the fluidization of the solid feedstock in the high pressure conveyance vessel 184. Indeed, the controller 124 may control all of the operations of the solid fuel feeder 105, starting with the receiving of the fuel 102, continuing through the feed preparation (e.g., drying, milling, pulverizing) and conveyance process, and including the startup of the gasifier 106.

During the startup of the gasifier 106, the controller 124 may convey the solid feed 102 into the high pressure conveyance vessel 184 by using solid feed pumps 182. A flow of the startup $CO_2$ 138 may also be directed into the high pressure conveyance vessel 184 via conduit 194. In one embodiment, jets of the startup $CO_2$ 138 conveyed through the conduit 194 may be directed at the solid feed entering the high pressure conveyance vessel 184 so that the solid feed particulate may be substantially dispersed and evenly distributed within the high pressure conveyance vessel 184. During the transition period from startup operations to normal operations, the jets of startup $CO_2$ 138 may transition to jets of extracted $CO_2$ 196 (i.e., $CO_2$ being produced by the carbon capture system 118) and also used to disperse and distribute the solid feed within the high pressure conveyance vessel 184. It is to be understood that both the startup $CO_2$ 138 and the extracted $CO_2$ 196 may each be at least approximately 80, 85, 90, 95, or 100 percent pure by volume. Further, the percent purity by volume of the startup $CO_2$ 138 need not be the same as the percent purity by volume of the extracted $CO_2$ 196. For example, startup $CO_2$ 138 may be 80 percent pure by volume while extracted $CO_2$ 196 may be 95 percent pure by volume or vice versa During startup operations, a flow of startup $CO_2$ 138 may also be directed into the bottom of the high pressure conveyance vessel 184 via a bottom conduit 198. The startup $CO_2$ 138 entering the high pressure conveyance vessel 184 through the bottom conduit 198 may further enable the transition of the solid feed and the carrier gas into a fluidized phase by creating a gas vortex that enhances the fluidization of the fuel.

During the transition period from startup operations to normal operations, the $CO_2$ entering the high pressure conveyance vessel 184 may transition from the startup $CO_2$ 138 into the extracted $CO_2$ 196 as sufficient quantities of the extracted $CO_2$ 196 become available from the carbon capture system 118.

The gas/fuel fluidized mixture may then exit the high pressure conveyance vessel 184 via a conduit 200. During plant startup, the gas/fuel fluidized mixture may be directed via conduit 202 into a startup cyclone 204. The startup cyclone 204 may be used to establish a steady, constant flow of the fuel into the gasifier 106. Once a steady, constant fuel flow has been established, the fuel flow going into the startup cyclone 204 may be redirected to flow into the gasifier injectors 206 via a conduit 208. As mentioned above with respect to FIG. 1, the gasifier 106 will combust the solid fuel 102 to produce syngas. $CO_2$ 196 can be extracted from the syngas and can be used to transition from the startup $CO_2$ 138 as described in more detail below with respect to FIG. 3.

Figure 3:
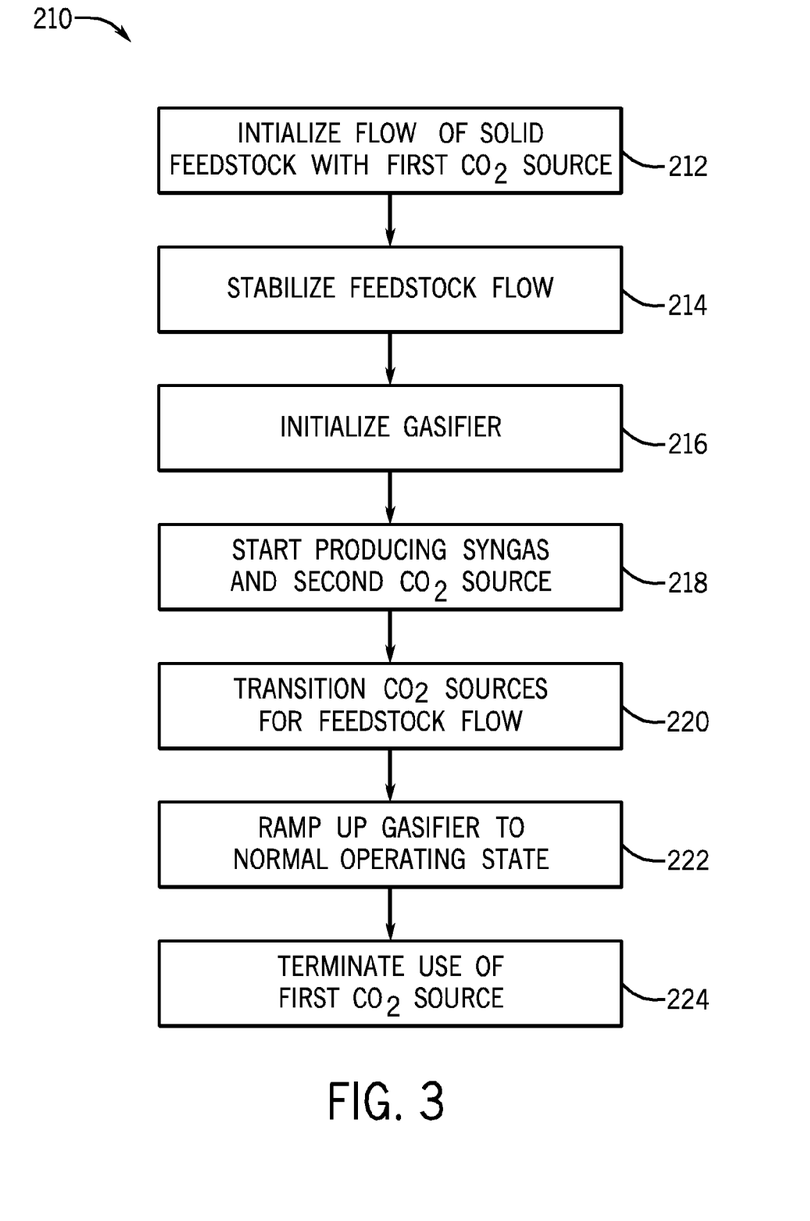
FIG. 3 is a flowchart of a method of transitioning between startup and steady state operation of a gasifier; and, FIG. 4 is a graph of a transition from a first $CO_2$ source to a second $CO_2$ source for conveying a solid fuel feed to a gasifier.

FIG. 3 is a flow chart of an embodiment of a method 210 that may be used, for example, by the gasifier fuel controller 124 of FIGS. 1 and 2, to start up plant operations and transition into normal operations. More specifically, the method 210 details a process that may be employed when starting the gasification process by using a first carbonous gas (e.g., $CO_2$) source and consequently transitioning to the use of second carbonous gas (e.g., $CO_2$) source as a carrier gas to feed a solid dry feedstock into a gasifier. In certain embodiments, the first source of carbonous carrier gas is always available and the second source of carbonous carrier gas is only available during operation of the gasifier. In embodiments where the first and second source of carbonous gas is $CO_2$ gas, the first $CO_2$ source may include the sources of startup $CO_2$ 138 as illustrated in FIGS. 1 and 2. As mentioned above with respect to FIG. 1, startup $CO_2$ 138 may be reused from a plurality of locations such as the $CO_2$ sequestration 120, the EOR pipeline 122, and/or some other $CO_2$ source 134. The use of startup $CO_2$ 138 as the first carrier gas used during power plant startup operations may be advantageous because it may allow for the same type of carrier gas (e.g., $CO_2$) to be employed throughout the plant's operational cycle from startup through normal operations and shutdown. Accordingly, the same types of fuel injectors, feedstock conveyance control modalities, feedstock conveyance equipment, and so forth, can be reused and need not be changed to conform to a different startup carrier gas (e.g., nitrogen).

The method 210 may begin by initializing a flow of solid feedstock and by using a flow of the startup $CO_2$ 138 (block 212). The flow of the first $CO_2$ source may include using a single source such as the EOR pipeline 122 or a combination of sources of $CO_2$ such as the EOR pipeline 122 combined with the carbon sequestration system 120. Indeed, any sources of startup $CO_2$ 138 may be combined or used individually as the first $CO_2$ source that delivers the $CO_2$ needed to initialize the flow of the solid feedstock. In one embodiment, the $CO_2$ from the first $CO_2$ source and the solid feedstock may then be fluidized, for example, by using a high pressure conveyance vessel 184 as described above with respect to FIG. 2 in order to produce a fluidized fuel/gas mixture.

After the flow of solid feedstock has been initialized, the feedstock flow may be stabilized (block 214) by, for example, using a startup cyclone 204 as illustrated in FIG. 2. In one embodiment, bypass and/or startup conduits may be used in conjunction with the startup cyclone 204 to create a stabilized, steady flow loop of the fluidized feedstock. In this embodiment, the fluidized fuel/gas mixture flows through the bypass and/or startup conduits and through the startup cyclone 204. The solid fuel may be removed from the gas by the startup cyclone 204 and returned to solid fuel storage for later reuse by the bypass and/or startup conduits. The flow loop going from the solid fuel storage into the startup cyclone and back to the solid fuel storage may thus serve to properly create a flow of fuel that is consistent (i.e., has the proper fuel-to-gas ratio, flow rate, pressure, and temperature) during startup operations.

Once a stable, steady flow of feedstock is achieved, the gasifier may be initialized (block 216) to begin the gasification of the fuel. Initializing the gasifier may include the redirection of the fluidized feedstock flow from the startup cyclone 204 into the gasifier injectors 206. The gasifier may have been preheated so that thermal energy stored in, for example, refractory bricks, helps initialize and sustain the gasification process. The gasifier fuel controller 124 of FIG. 2, may control the flow of solid fuel entering the gasifier injectors 206 by, for example, varying the speed of the solid feed pumps 182, and/or the flow rates, pressure, and temperature of the first $CO_2$ source (e.g., startup $CO_2$ 138). The gasifier fuel controller 124 may aid in the gasification initialization by following certain procedures related to fuel-to-gas ratios and fuel loading velocities that are required for initialization purposes.

Initially, approximately 100% of the $CO_2$ that may be used to convey the fuel into the gasifier injectors 206 may be directed from the first $CO_2$ source. As the gasifier begins gasification and starts producing syngas, IGCC power plant components may then use the resulting syngas to produce $CO_2$ as a second $CO_2$ source (block 218). The second $CO_2$ source may include, for example, the carbon capture system 118 of FIG. 1. As more syngas becomes available, the method 210 may transition from using the first $CO_2$ source (e.g., startup $CO_2$ 138) to using the second $CO_2$ source (e.g., extracted $CO_2$ 196) to replace some of the first $CO_2$ as the carrier gas (block 220).

In one embodiment, the gasifier fuel controller 124 may control a set of valves to combine both startup $CO_2$ 138 as well as extracted $CO_2$ 196 so that they both are used as the carrier gas as described in more detail below with respect to FIG. 4. As sensors indicate more availability of the extracted $CO_2$ 196, the gasifier fuel controller 124 may redirect more extracted $CO_2$ 196 and less startup $CO_2$ 138 to be used as the carrier gas. It is to be understood that the combining of startup $CO_2$ 138 with extracted $CO_2$ 196 may include the use of components such as pressure regulators, mixing tanks, compressors, heaters, chillers, and so forth that allow for the combination of gases that may have different flow rates, pressures, and temperatures.

As the gasifier and the remainder of the power plant ramp up to normal operations (block 222), more quantities of syngas, and consequently more quantities of the second $CO_2$ may be produced. Accordingly, the method 210 may redirect more quantities of the second $CO_2$ and less quantities of the first $CO_2$ into the feedstock preparation and conveyance process until approximately 100% of the carrier gas may be the second $CO_2$. When the second $CO_2$ reaches a desired percentage, e.g., 100%, then the first $CO_2$ may no longer be used as a source of $CO_2$ (block 224).

Figure 4:
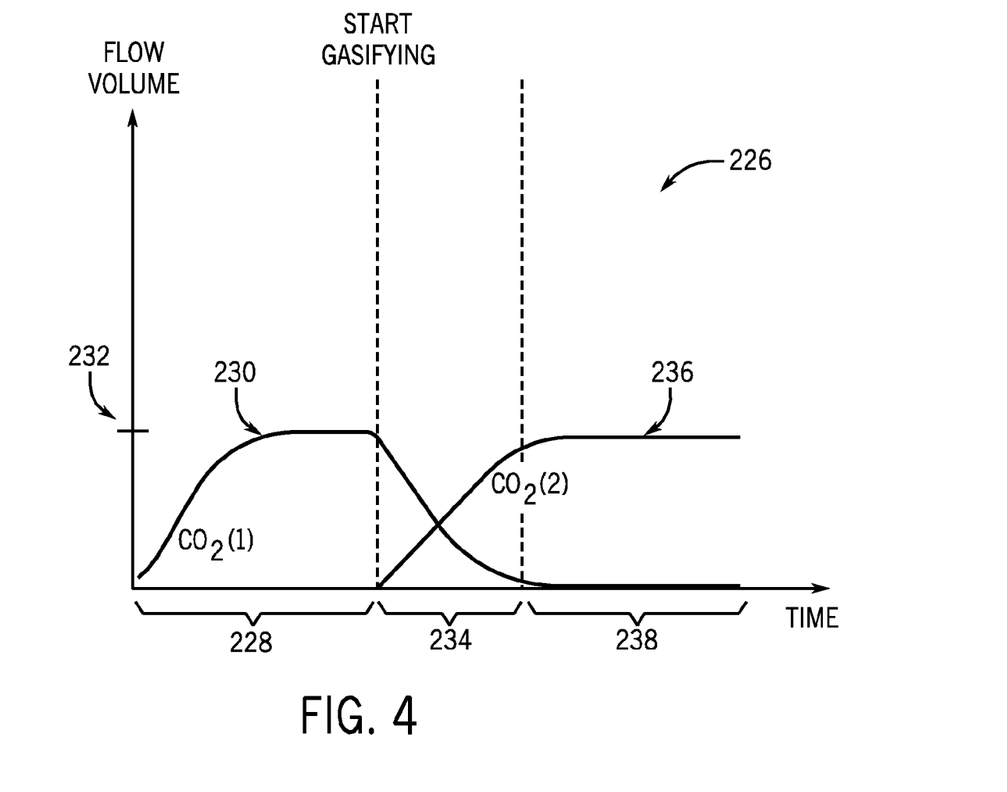

FIG. 4 is a graph of an embodiment of a $CO_2$ transition model 226 that may be used to transition from a first $CO_2$ (e.g., startup $CO_2$ 138) to a second $CO_2$ (e.g., extracted $CO_2$ 196) as a carrier to transfer a solid dry feedstock 102 into gasifier 106. The ordinate (i.e., y-axis) of the graph represents a flow rate of the first $CO_2$. The abscissa (i.e. x-axis) represents time. As described above with respect to FIG. 3, the first $CO_2$ source (e.g., $CO_2$ 138), may be used as the startup source of $CO_2$ to initialize plant operations. A second $CO_2$ (e.g., $CO_2$ 196) may then be used to transition from startup operations to normal operations.

In an initialization period 228, the controller 124 may start a flow 230 of the first $CO_2$ as the plant begins the startup process. The flow 230 may then reach an operational flow level 232. At operational flow level 232, the plant may be operating such that the second $CO_2$ is now being produced. It is to be understood that the flow rate of operational flow level 232 and the time required to reach the operational flow level 232 may depend on the type (e.g., entrained flow gasifiers, fluidized bed gasifiers, fixed bed gasifiers) and the specific model of the gasifier being used.

In certain embodiments, the controller 124 may then enter a transition period 234 where a flow rate 236 of the second $CO_2$ may be added to the flow rate 230 of the first $CO_2$. The transition period may begin, for example, when a sufficient volume at a sufficient pressure of the extracted $CO_2$ 196 produced by gasification operations becomes available. As gasification operations produce increasing quantities of the second $CO_2$, the controller 124 may augment the flow rate 236 of the second $CO_2$ and reduce the flow rate 230 of the first $CO_2$. The process of reducing the flow rate 230 of the first $CO_2$ and augmenting the flow rate 236 of the second $CO_2$ may then continue until gasification operations produce sufficient volumes of the second $CO_2$ so as to attain the operational flow level 232. At the operational flow level 232, the source of the first $CO_2$ can be turned off and the plant may then continue to operate by using the second $CO_2$. Accordingly, an operations period 238 of the graph depicts the use of the second $CO_2$ as the main $CO_2$ used for plant operations. It is to be understood that the embodiments disclosed herein allow for many variations of a $CO_2$ transition model, such as the example $CO_2$ transition model 226, to be used. Indeed, the level 232 may be lower or higher, and the upward and downward curves of the flow rates 230, 236 may adjusted, for example, to have different slopes so as to more efficiently and economically transition from a first $CO_2$ gas to a second $CO_2$ gas through a wide variety of power plant 100 operations and power plant 100 embodiments.

Technical effects of the invention include the ability to transition from a startup $CO_2$ carrier gas used to start gasification operations to an extracted $CO_2$ carrier gas, which may be used to continue normal gasification operations. Sources of the startup $CO_2$ carrier gas may include an enhanced oil recovery pipeline, a carbon sequestration system, and others such as $CO_2$ storage tanks. Sources of an extracted $CO_2$ carrier gas include a carbon capture system. Further effects include enhanced life spans of gasifier components such as fuel injectors due to lower heat requirements, the capability to utilize the same solid-to-gas fuel loading ratios and fuel loading velocities during startup and normal operations, and increased performance of the acid gas removal process because of increased partial pressure of $CO_2$ in syngas This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising: a gasifier configured to gasify a solid fuel; a solid fuel feeder; and a controller configured to generate a first signal to control a first valve fluidly coupled to a first source of a carbonous carrier gas, to generate a second signal to control a second valve fluidly coupled to a second source of the carbonous carrier gas, and to control a feed of the solid fuel in the carbonous carrier gas from the solid fuel feeder to the gasifier during a startup period and a steady state period of the gasifier, wherein the controller is configured to control the feed of the solid fuel in the carbonous carrier gas acquired from the first source through the first valve during the startup period and acquired from the second source through the second valve during the steady state period, and wherein the first and second sources are different from one another.

2. The system of claim 1, comprising the first source of the carbonous carrier gas configured to provide the carbonous carrier gas comprising a carbon dioxide that is at least approximately 80 percent pure by volume.

3. The system of claim 1, comprising the first source of the carbonous carrier gas; wherein the first source of the carbonous carrier gas comprises at least one of an enhanced oil recovery (EOR) pipeline, a carbon sequestration system, or a storage tank.

4. The system of claim 1, comprising the second source of the carbonous carrier gas; wherein the second source of the carbonous carrier gas comprises a carbon capture system coupled to a gasification system.

5. The system of claim 1, wherein the controller is configured to control the feed of the solid fuel in the carbonous carrier gas acquired from both the first source and the second source during a transition period from the startup period to the steady state period.

6. The system of claim 5, wherein the controller is configured to decrease a first gas flow rate from the first source and increase a second gas flow rate from the second source during the transition period.

7. The system of claim 1, wherein the controller is configured to fluidize particles of the solid fuel in the carbonous carrier gas.

8. The system of claim 7, comprising a feedstock preparation unit having the solid fuel feeder, wherein the feedstock preparation unit is configured to pulverize the solid fuel into the particles.

9. The system of claim 1, wherein the solid fuel feeder comprises a solid feed grinder configured to grind the solid fuel.

10. A system comprising: a feedstock preparation unit; a solid fuel grinder configured to grind a solid fuel into particles; and a solid fuel feeder comprising a controller configured to generate a first signal to control a first valve fluidly coupled to a first carbonous gas source, to generate a second signal to control a second valve fluidly coupled to a second carbonous gas source, and to fluidize the particles into a carbonous carrier gas delivered through the first valve from the first carbonous gas source during a startup period of a gasifier and delivered through the second valve from the second carbonous gas source during a steady state period of the gasifier.

11. The system of claim 10, wherein the controller is configured to combine gas flows of the carbonous carrier gas from both the first carbonous gas source and the second carbonous gas source to convey the particles of the solid feed to the gasifier during a transition period from the startup period to the steady state period.

12. The system of claim 11, wherein the controller is configured to decrease a first gas flow rate from the first carbonous gas source and increase a second gas flow rate from the second carbonous gas source during the transition period.

13. The system of claim 12, comprising the first carbonous gas source configured to provide the carbonous carrier gas comprising a carbon dioxide that is at least approximately 80 percent pure by volume.

14. The system of claim 10, comprising the gasifier, wherein the controller is configured to control a flow of the particles into the gasifier and the gasifier is configured to produce a syngas by using the particles.

* * * * *